US005494517A

United States Patent [19]

Eder et al.

[11] Patent Number: 5,494,517

[45] Date of Patent: Feb. 27, 1996

[54] DEVICE FOR SUPPORTING OR TRANSPORTING OBJECTS TO BE TREATED WITH SPRAY HAVING MEANS FOR COLLECTING AND REMOVING EXCESS SPRAY

[75] Inventors: Michael Eder, Weidengasse 9, A-9900 Lienz; Franz Waldner, Lienz/Debant, both of Austria

[73] Assignee: Michael Eder, Lienz, Austria

[21] Appl. No.: 91,303

[22] Filed: Jul. 12, 1993

[30] Foreign Application Priority Data

| | | | |
|---|---|---|---|
| Jul. 15, 1992 | [AT] | Austria | 1443/92 |
| Mar. 16, 1993 | [WO] | WIPO | PCT/AT93/00048 |

[51] Int. Cl.[6] .............. B05B 13/00; B05B 1/28; B08B 3/04

[52] U.S. Cl. .............. 118/324; 118/70; 118/107; 118/326; 134/104.1; 134/104.2; 134/131

[58] Field of Search .............. 118/300, 320, 118/324, 322, 326, 107, 108, 123, 126, 628, DIG. 7, 70; 198/495, 496, 497, 498, 499, 500; 134/104.1, 104.2, 131

[56] References Cited

U.S. PATENT DOCUMENTS

| | | | |
|---|---|---|---|
| 1,908,076 | 5/1933 | Steinberg | 118/326 |
| 2,232,561 | 2/1941 | Richards . | |
| 2,486,877 | 11/1949 | Ransburg et al. | 118/628 |
| 2,509,276 | 5/1950 | Ransburg et al. | 118/628 |
| 2,548,739 | 4/1951 | Peck | 198/500 |
| 2,854,946 | 10/1958 | Norris | 118/324 |
| 3,252,401 | 5/1966 | Smith . | |
| 3,744,450 | 7/1973 | Hardy | 118/326 |
| 3,902,455 | 9/1975 | Lehmann et al. | 118/326 |
| 3,918,641 | 11/1975 | Lehmann et al. | 118/621 |
| 4,279,215 | 7/1981 | Schäfer | 118/326 |
| 4,323,030 | 4/1992 | Lehmann, Jr. | 118/326 |
| 4,408,688 | 10/1983 | Bieri | 198/500 |
| 4,417,541 | 11/1983 | Schäfer | 118/326 |
| 4,506,625 | 3/1985 | Vöhringer | 118/326 |
| 4,836,137 | 6/1989 | Heine et al. | 118/326 |
| 4,865,887 | 9/1989 | Virtanen | 427/356 |
| 4,888,200 | 12/1989 | Milliken | 118/70 |
| 4,924,803 | 5/1990 | Celant | 118/326 |
| 5,031,750 | 7/1991 | Barnes | 198/497 |
| 5,036,792 | 8/1991 | de Poly | 118/326 |
| 5,147,028 | 9/1992 | Raggi | 198/495 |

FOREIGN PATENT DOCUMENTS

| | | | |
|---|---|---|---|
| 0141171 | of 0000 | European Pat. Off. . | |
| 2823958 | of 0000 | Germany . | |
| 3400072 | of 0000 | Germany . | |
| 2841395 | 3/1980 | Germany | 118/628 |
| 2840803 | 4/1980 | Germany | 118/326 |
| 724217 | 3/1980 | U.S.S.R. | 118/326 |

*Primary Examiner*—Karen M. Hastings
*Assistant Examiner*—Steven P. Griffin
*Attorney, Agent, or Firm*—Lorusso & Loud

[57] ABSTRACT

Spray treatment device, particularly for spray-painting of objects, comprising a transport means and collection means for collecting the excess spray medium passing by the objects and the transport means. According to the invention, the collection means comprises an endless rotation belt independent of said transport means. A removal device removes the spray medium from said belt.

27 Claims, 14 Drawing Sheets

DEVICE FOR SUPPORTING OR TRANSPORTING OBJECTS TO BE TREATED WITH SPRAY HAVING MEANS FOR COLLECTING AND REMOVING EXCESS SPRAY

BACKGROUND OF THE INVENTION

The invention relates to a spray-treatment device, in particular to a device for spray-painting of objects comprising a transport means or a support for the objects, and collection means for collecting the excess spray medium passing by the objects and the transport means.

With the application of the spray medium (i.e. spraying of liquid lacquer or powder) on the objects (work piece) the problem arises to remove the spray medium which does not reach the objects while subsequently complying with environmental laws.

It is known to combine the excess spray medium (overspray) with coagulating agents dispersed in water, thus extracting a sediment. The resulting sediment is, of course, hazardous waste, which is problematic and costly to remove. In addition, the water's surface is not arranged in a favorable spatial position for collection and a highly mechanical/technical effort is necessary in order to incorporate this technology.

Furthermore, it is known to send the objects on conveyer belts through an automatic spray-machine to mechanically remove deposited spray-medium excess by scraping or abrasion. This system serves mainly for the purification of the conveyer belt.

The desired collection of the excess spray-medium in conjunction with recycled use is not evident. Moreover, the conveyer belts must be dried after the abrasion before they come in renewed contact with the objects. The speed of the excess spray-medium is pegged to a slow conveyor speed of the objects in the spray machine, whereby a considerable amount of time passes between the spraying of the spray medium and the collection of the excess from the conveyor belts. This leads to increased evaporation of the solution, not only imposing a greater environmental burden, but also hindering collection of the spray-medium on the conveyor belts.

Furthermore, it is also known in DE-OS 28 23 958 to provide a spray-compartment in which the objects are suspended on hooks, in order to form, by means of a rotating belt, a vertical curtain for the preliminary spray medium on the objects, thereupon the deposited spray-medium on the belt is mechanically stripped off the belt.

SUMMARY OF THE INVENTION

According to one aspect of the invention, the invention is based on an automatic device for spray treatment in which the objects are moved continuously or step by step by a transport means or support. In order to collect as much as possible of the excess spray-medium passing by the objects, and to approach the concept of recycling, the invention provides that the collection means comprises an endless belt independent of said transport means or support. Furthermore, there is a removal device for removal of spray medium from the belt.

Thereby the transport means is favorably formed exposing the least possible surface to the spray medium, i.e. advantageously e.g. with two or more adjacent narrow conveyor belts. On the side of the objects averted from the spraying nozzles, the endless collection belt rotates, from which the impacted spray medium is removed by means of a removal device touching the belt.

It is essential that the rotating belt used for collection of the excess spray medium is moveable independently of the transport means (preferably narrow adjacent conveyer belts). It is possible to adjust the speed of the collection belt independently of the speed of the objects going through the spray system. It is thus possible to conform the conveyor speed to each specific spray medium with continuous speed regulation of the belt. It is especially possible to allow the collection belt to run essentially faster than the conveyor speed for the belt responsible for transport of the objects through the spray device. Thereby an excessive evaporation of the solvent of the lacquer can be reduced, which on the one hand protects the environment and on the other hand allows for easier removal of the lacquer from the belt due to lower viscosity.

The collection belt can advantageously be arranged across the conveyor direction of the transport means. Thus a favorable arrangement of the collection belt removal device as well as the accompanying drive unit is possible. Also such a device for the collection of the excess spray-medium is easily applicable to many existing types of automatic spray treatment devices.

Especially with larger systems (wide belts for the collection of excess spray medium) the problem arises for complete removal of the spray medium from the collection belt. The invention intends to solve this problem by means of impressed lips forming one or more traces of the medium on the belt whose width is essentially smaller than the belt width. In a second step, these spray medium traces are completely removed by a removal unit from the belt. By this also the border region of the belt may be reached. Moreover, this seperation of trace-forming removal allows for structural components, which are specifically designed and adapted for their use, thus facilitating an improved removal as well as easier operation (especially a cleaning of the belt is possible when the color of the medium is changed).

Such two-stage removal (first a trace of the spray medium is formed on the collection belt and then this trace is removed) may also be used for spray treatment devices where the objects are not automatically moved through a transporter but rather are secured on an fixed support. Further features of the invention may be used not only for spray-treatment-devices with automatic transportation of objects, but also the feature of installing stationary supports.

In order to comprehend these two possibilities with a single expression, the present application uses the expression "support" not only for stationary supports but also for movable supports, i.e. transport means in an automatic spray treatment device.

DESCRIPTION OF THE DRAWING

Further advantages and features of the invention will be described in more detail in the following description of the drawings.

DETAILED DESCRIPTION OF THE PREFERRED EMBODIMENT

Figure 1:
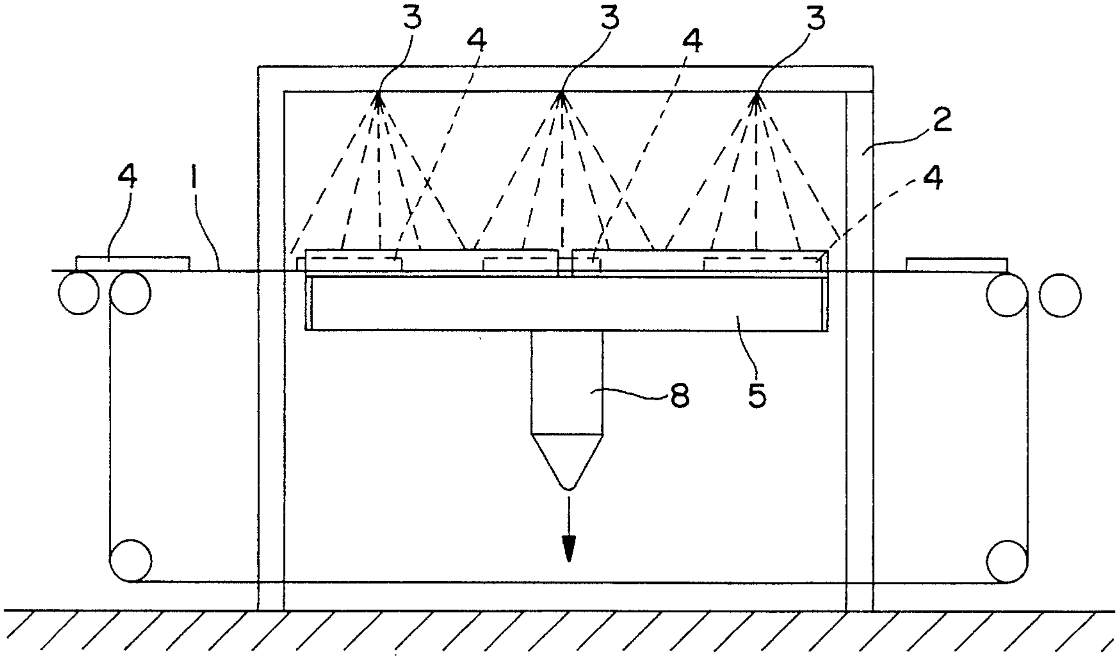
FIG. 1 shows a schematic representation (side view) of the inventive spray treatment device where the objects are automatically moved by a transporter.
Figure 2:
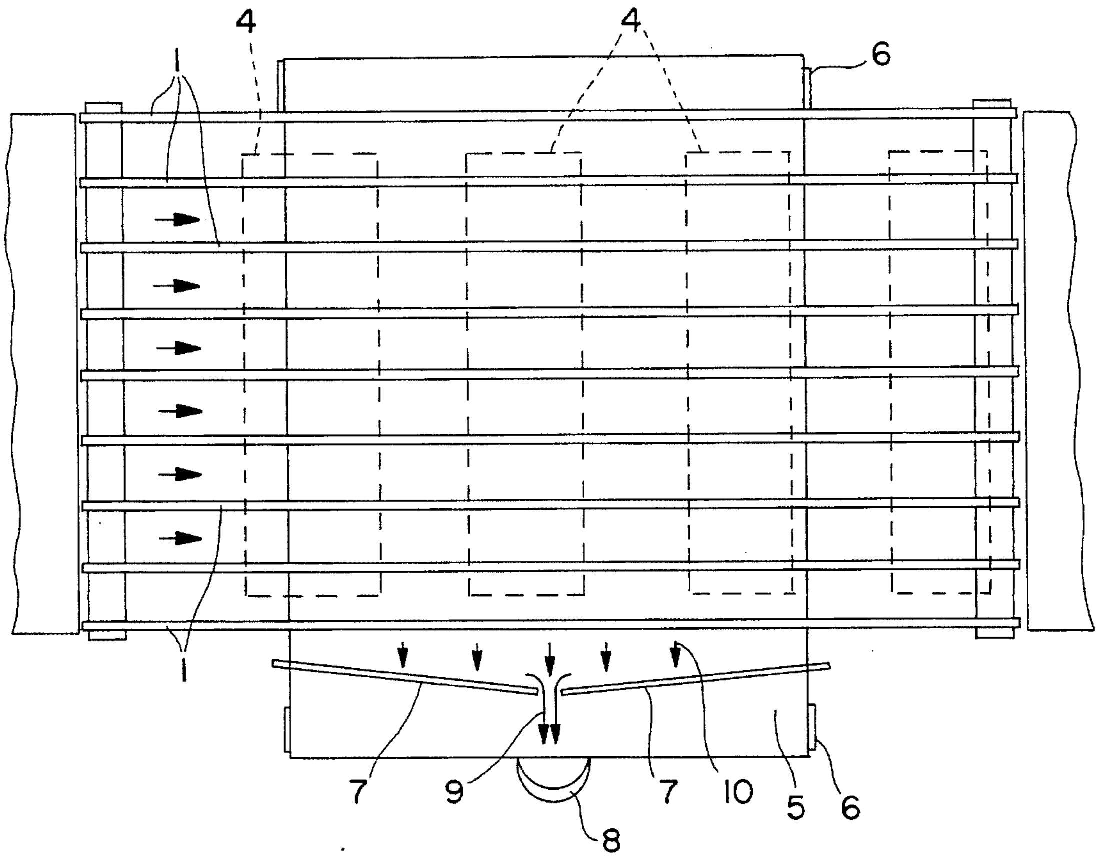
FIG. 2 shows a schematic representation of FIG. 1 from the top view.

FIGS. 1 and 2 show an automatic spray (lacquer) treatment device of objects with a transport means (1) which moves the desired objects through the actual spray chamber (2). The spray medium is applied onto the objects (4) by spray nozzles (3) overhead.

In order to collect the excess spray medium passing by the objects (overspray) (4), a rotating belt (5) is provided underneath the transport transport means (1). The upper-half of the endless belt, which is directed over guide rollers (6) (from which it is driven), lies parallel precisely beneath the support for the objects (4), which according to the embodiments of the invention, are formed through multiple rotating narrow conveyor belts of the transport means (1). The gap between the conveyor belts is larger than the actual belt width, thus offering the least possible surface to the spray medium and the majority of the diverted spray medium lands on the belt (5). The belt for the collection of the spray medium runs perpendicular to the direction of the transporter (1). This permits a parallel guidance of the belt (5) underneath the transporter (1), whereby the not yet mentioned trace-forming lips (7) and the removal pipe (8) can be arranged exterior to the transport means (1). Thus the spatial arrangement is optimally utilized and said collection belt, including the removal device, can be supplemented to existing automatic spray systems. The precise guidance of the belt (0.2 mm to 5 cm, preferably 0.2 mm to 2 cm) beneath the support for the objects (4) prevents an unwanted exposure of excess lacquer material (overspray) underneath the objects (4).

According to a preferred embodiment of the invention, the collection of the spray medium on the belt (5) takes place by first forming a narrow trace (9) on the belt (narrower than the belt width), whereby the spray medium is then removed by a removal device from the belt. According to the invention the trace formation means comprises two elastic lips (7) pressed against the belt (5), placed at a slight angle with the belt's (5) direction of transport (10) and thus forming a single trace (9) of spray medium in the middle of the belt (5). In the preferred embodiment the lips are made of an elastic material, preferably a thin metal blade. This trace (9) can be easily and completely removed by a collection pipe (8) elastically pressed against the belt from below.

Figure 5:
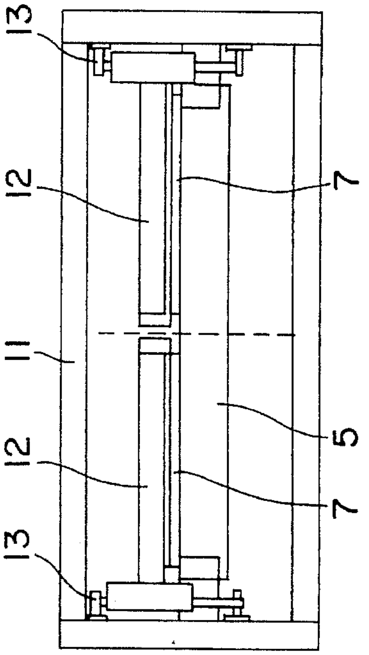
FIG. 5 shows a front view of FIG. 3.
Figure 3:
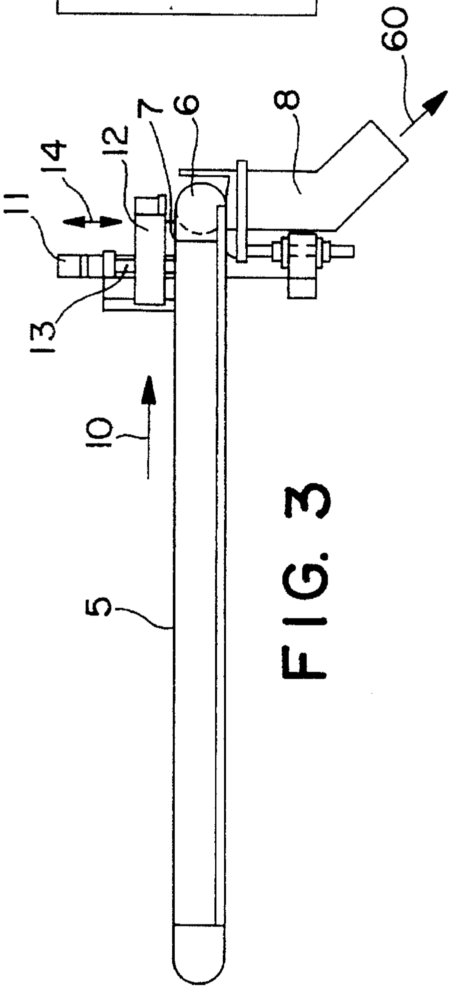
FIG. 3 shows a side view of the belt for collection of the excess spray medium which is collected by a haul-off device.
Figure 4:
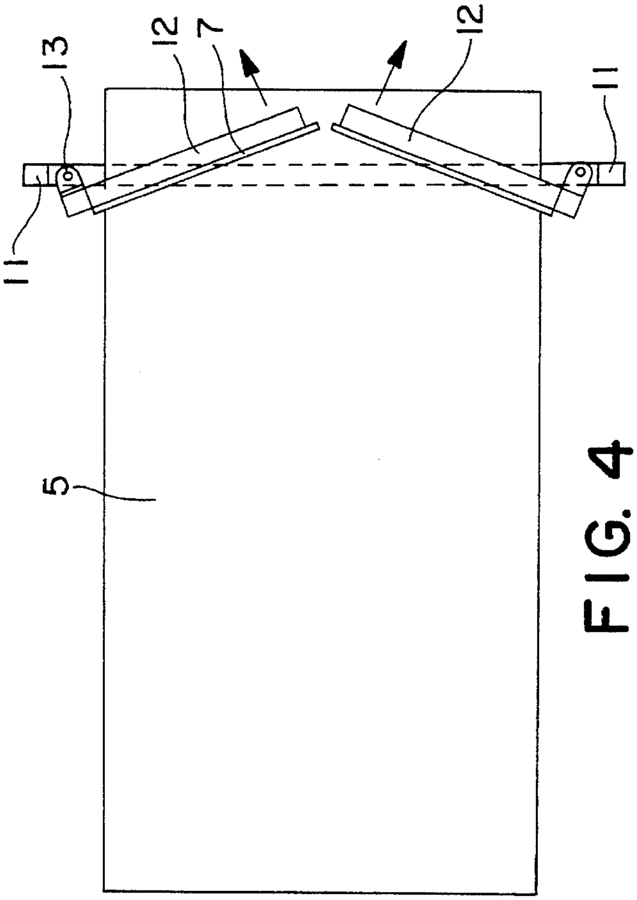
FIG. 4 shows a top view of FIG. 3.

In FIGS. 3 through 5, further details of the belt (5) and the removal system for the spray medium are characterized. On a frame (11), arms (12) for the lips (7) are mounted to revolve around a vertical axis (13). Moreover, the arms (12) can be moved in the direction of the arrows (14), i.e. lifted off the belt (5) pressed thereon. During operation the angular position of the arm (12), as shown in FIG. 4, leaves a small gap between the lips (7) in the middle of the belt, through which the trace of lacquer leaves. During operation the angular position is restrained by suitable supports, whereby the arms (12) including the lips (7) are pressed from above in vertical direction on the belt (5). In addition, springs or pneumatic devices can be provided. For purification of the lips (7), the arms (12) can be lifted/swung about the vertical axis of the plane. This is a determined operational advantage particularly with color changes.

For removal of the belt's lacquer trace formed by the lips (7), a removal pipe (8) is provided, that is elastically (i.e. with a spring device or pneumatic device, not shown) pressed on the bottom of the belt (5). The support point of the pipe-edge lies, in this case, precisely behind the guide roller (6). At this point, a satisfactory attachment of the pipe-edge to the belt (5) is possible. The complete drainage of the spray medium trace flows in direction of arrow (60) out of the pipe (8) and can be collected in a container or reservoir. Thus a recycled use of the lacquer is possible. The pipe (8) is also able to be lowered in the vertical direction and, if need be, subsequently removable (thus easily cleaned). Also other removal devices may be used, e.g. easily cleanable channels.

In order to reproduce the original viscosity in the solvent lacquer and/or control the trace formation and respective removal of the excess spray medium from the belt (5), a preferred embodiment of the invention shows an arrangement with a device (15) precisely in front of the removal pipe (8) and respective trace forming lips (7), for application of a additive agent (preferably a lacquer solvent). This device (15) can expel a continuous supply capacity (17) for the additive agents and be further distributed by nozzles (16) over the width of the belt (5). The agents can be applied in the most desirable manner. For example, a showering or a dripping is possible.

Figure 6:
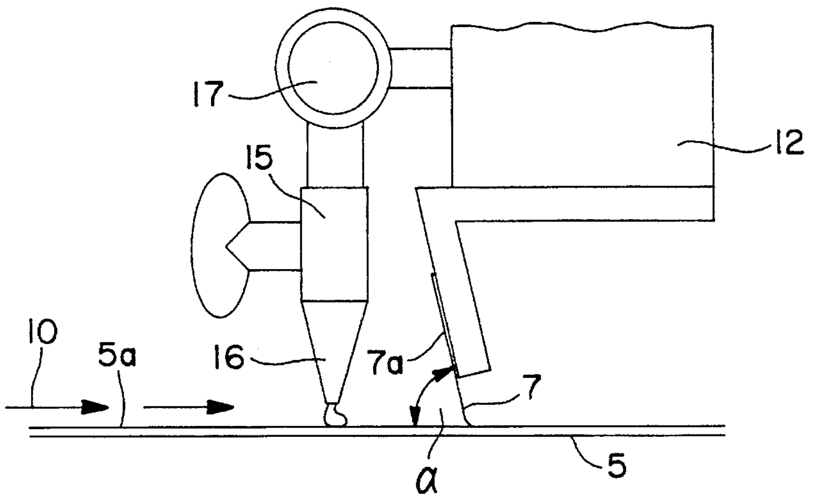
FIG. 6 shows a detail of a device for insertion of an additive agent (solvent) and a lip for formation of a trace.
Figure 7:
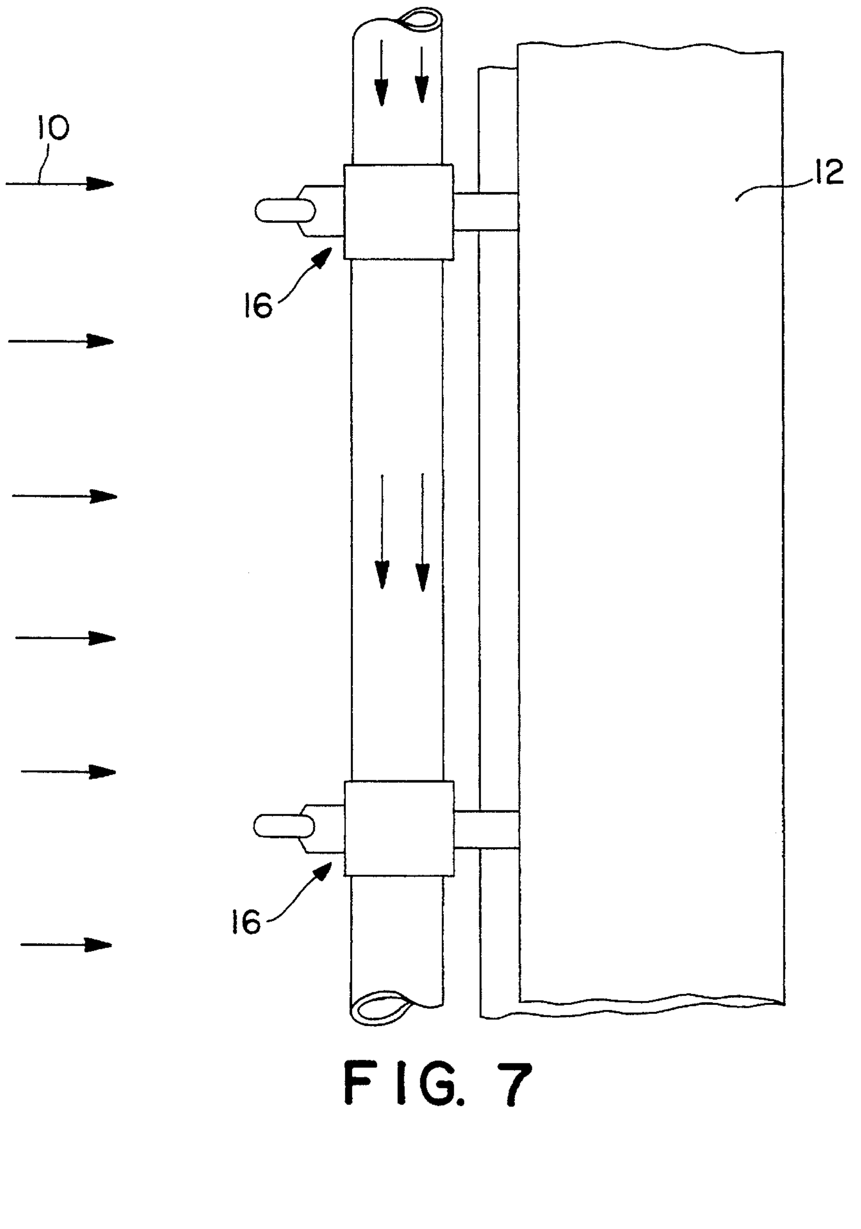
FIG. 7 shows a top view of FIG. 6.

Preferably the device (15) for application of the additive agents along with the device for trace-forming lips (7) can form a structural unit, as shown in FIG. 6 and 7, where both are fastened collectively to the arm (12). Thus the device (15) always adjusts in definite relative position to the lips (7) and is collectively removed from the belt.

As is shown in FIG. 6, the specific side (7*a*) of the lips (7) forms an acute angle (α) with the belt surface (5*a*). This has been a proven advantage with regard to a good trace formation and a lower material wear on the belt (5).

Figure 8:
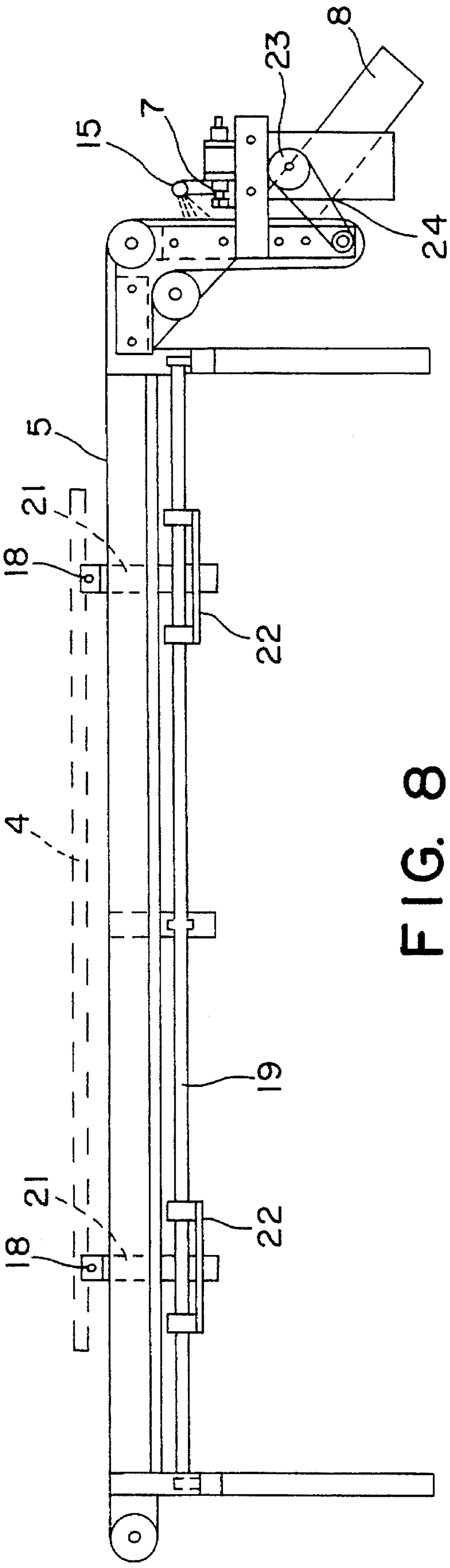
FIG. 8 shows a spray treatment device, whereby the objects are placed on a stationary support, with a specific embodiment of the system for collection and removal of the excess spray medium.
Figure 9:
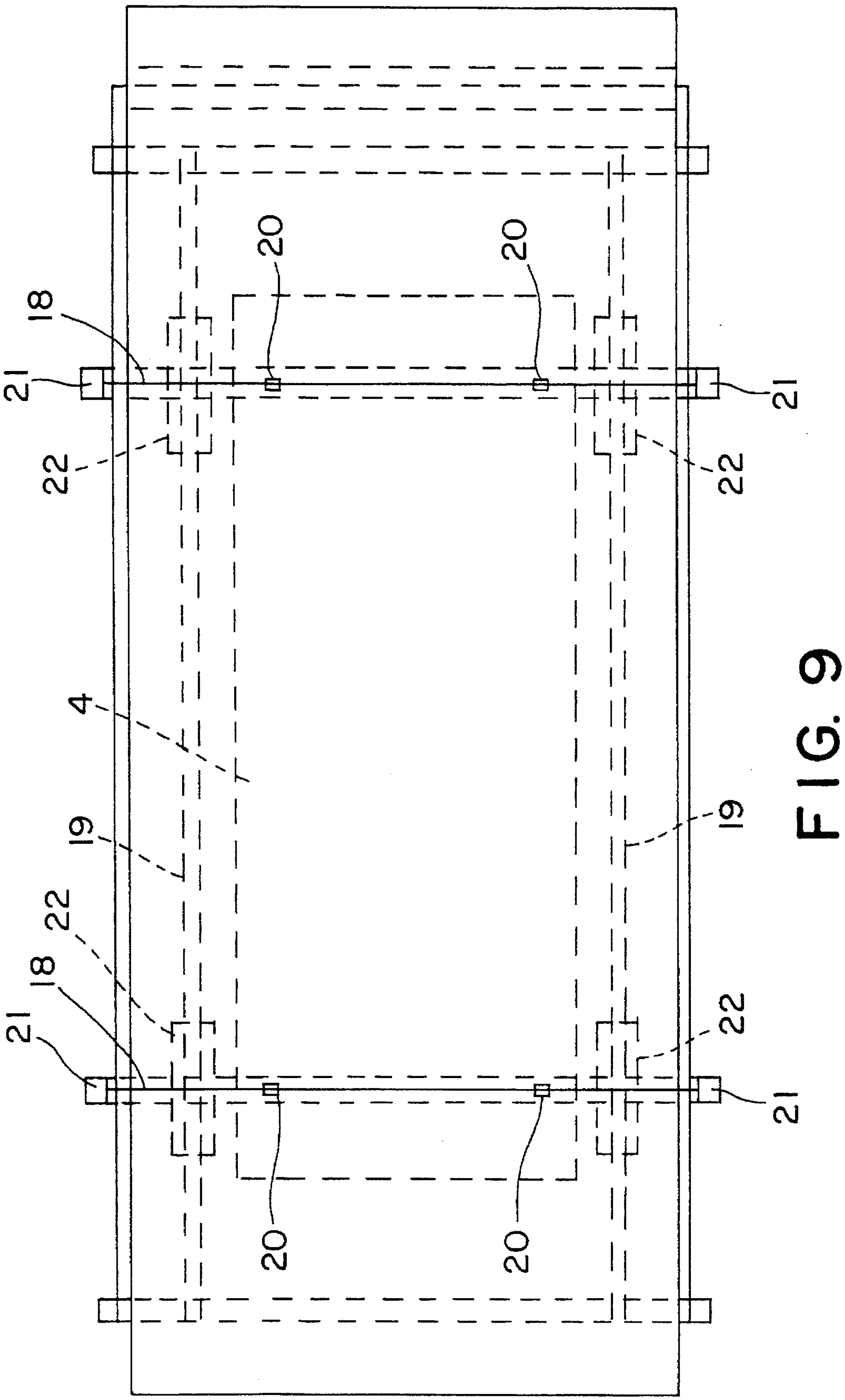
FIG. 9 shows a top view of FIG. 8, FIGS. 10, 11 show a schematic representation of an embodiment from the side-view, whereby the support can be turned up with the belt for the collection of the excessive spray medium.
Figure 10:
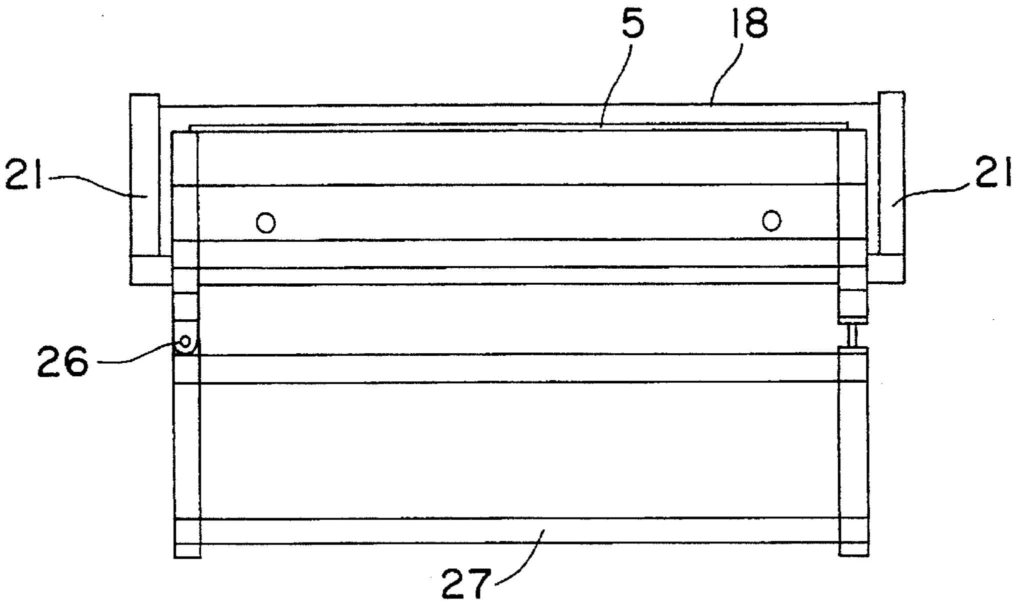

In FIGS. 8 and 9 a spray treatment device for objects is characterized, in which the object (4) is fastened on supports and is not automatically transported. The supports are formed using thin wires (18) that are stretched perpendicular over the continuously rotating belt (5). The wires (18), on which the object (4) rests over the support (20), are held in the side containers (21), which are fastened to a carriage (22). The carriage (22) can be adjusted on rails (19) in the belt's direction of transport thus allowing for conformity to the supported object (4). In principle, this carriage (18) could have been used for automatic transport of an object. However, in the preferred embodiment characterized in FIGS. 8 and 9, the carriage is to adjust in the corresponding position along the rails (19) with the placement of the objects and is then clamped thereon.

The upper-half of the rotating belt (5) runs precisely underneath the support (18); thus preventing an inadvertent deposit of overspray on the underside of the objects (4). The thin wires (18) offer little surface for the spray medium, which can be completely collected by the underlying belt (5), (unless medium reaches the objects (4). For removal of the excessive spray medium on the belt (5), a removal system is provided on the vertical region of the L-shaped belt (5). This consists of a device (15) for the application of solvents, a t race-forming device in the form of elastic lips, and finally a removal device (8) in the form of a pipe. The belt is driven by a motor (23) and a band (24).

As shown in FIG. 8, the removal on the vertical region of the belt (5) permits an easily accessible arrangement of the individual components.

Figure 11:
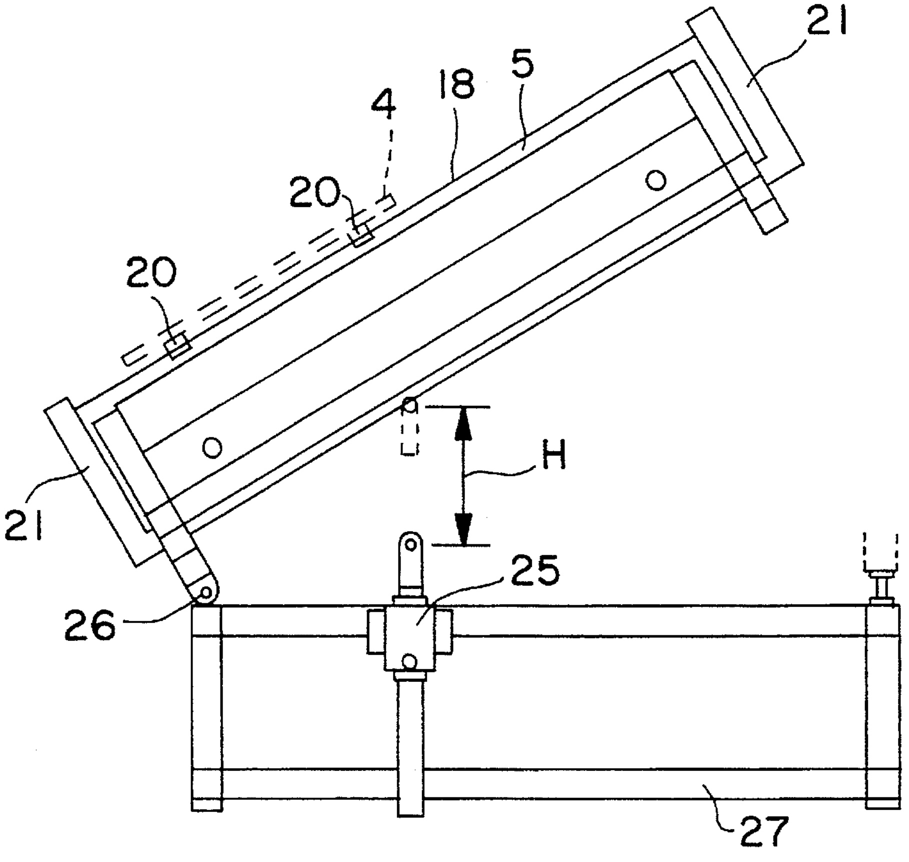

For manual spraying of objects (4) that rest on the anti-skid support (20) of the wires (18), a preferred variation of the invention presents the support (wires 18 including part 20) pivoting with the belt (5) for the collection of the excessive spray medium around a horizontal ·axis (26) revolving on a foundation (27). For high revolution, a pneumatic control-device 25 can be provided, shown in FIG. 11, consisting of a lift (H). Through the collective revolution of the support and belt, the relative position between the object and collection belt remains fixed. In particular, the belt (5) can be guided precisely below the object's (4). The high revolution permits a good accessibility to the objects (4) surface for a manual lacquer application by a spray pistol (not shown).

Figure 12:
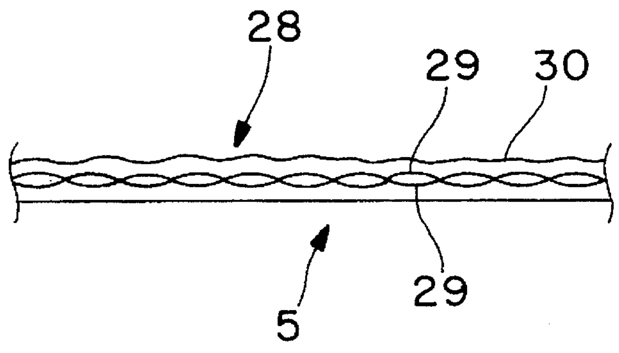
FIG. 12 shows a schematic representation of longitudinal view of the embodiment of a belt for collection of excessive spray medium.

For the best removal of the spray medium lying on the belt; in addition to the known trace formation lips and the removal pipe, the belt (5) itself is also of particular importance. It has already been proven as favorable if the belt (5) for the collection of the spray medium has a surface texture (28) i.e. not a completely smooth (FIG. 12). In a preferred embodiment, the textural base web is covered by a thin coating, preferably made of plastic. If the belt possess a structural base-line web (29) (e.g. made of polyester in warp and weft), the surface texture may "shine through" a thin coating (i.e., 1/10 mm urethane) thereon. This structural or textural surface has further advantages with regard to the lowest possible reflection of the spray-agent-particles off the belt (5). Particularly favorable for a good lacquer-removal from the belt (5) is a Shore hardness, in according with DIN 53505, in the region of 70–100.

Figure 13:
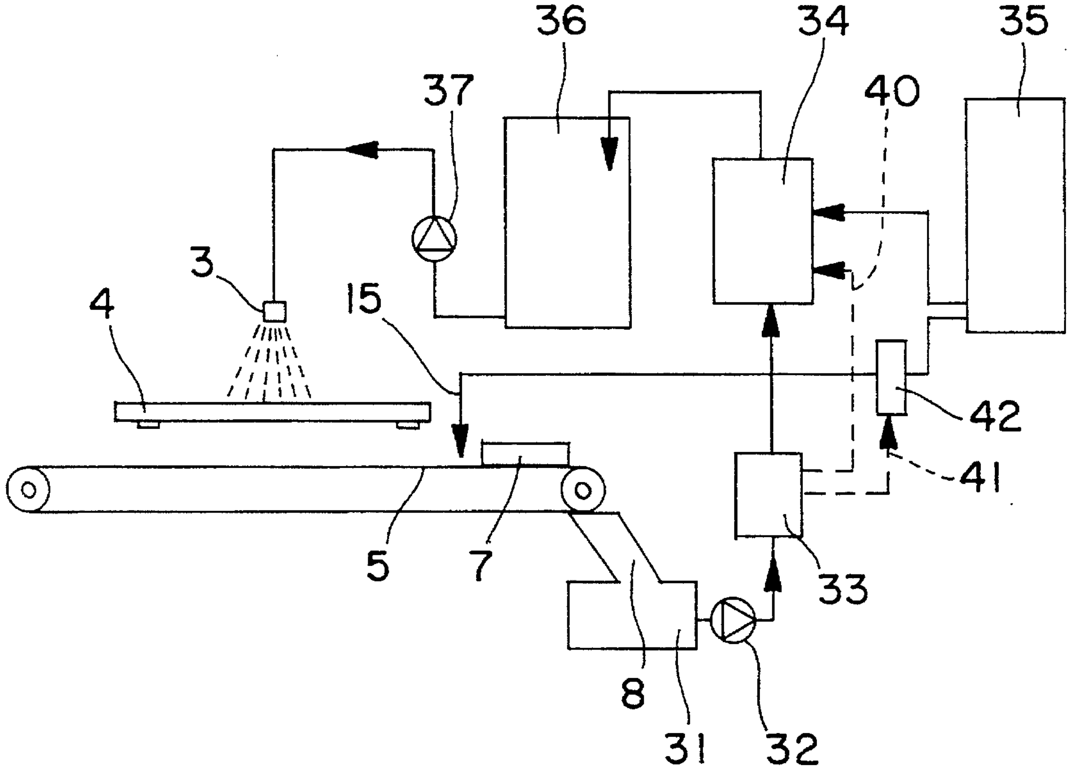
FIG. 13 shows a schematic representation for illustration of the recycling of the collected spray medium (lacquer)

FIG. 13 is a schematic representation of the recycling of the spray medium taken from the belt (5), by the lips (7) and the removal pipe (8). The spray medium arrives out of the pipe into a reservoir (31) and from there is taken by a pump (32) into a device (33) for the determination of the viscosity. In the device (34) solvents are added from a container (35) depending (regulator 40) on the determined viscosity in order to return the viscosity of the spray medium to a given value. Since the speed of the belt (5) can be very high, hardly any solvent disappears on the way to the removal point, so that the addition of the solvent is limited to low levels. The reprocessed spray medium arrives in the reservoir (36) from which it is transported by a pump (37) to the actual spray nozzles (3). As shown in FIG. 13, it is essential that all removed spray medium is always brought to the nozzles (3) in automatic circulation. This not only reduces the environmental burden, but also lowers the high cost of materials.

Alternatives or additions to the external device (34) for adding solvents for viscosity adjustments in spray agent removal systems (controlling the removal) can be approached. The addition of solvents can be irregular, for example manual adjustments to empirical values. However, it appears more favorable, (as shown in FIG. 13) to regulate the addition of the solvents in accordance with the desired viscosity by the conductor (41) and the dosage device (42). It is also conceivable for the device (15) to give standardized measurements of solvents with re-adjustment to the correct viscosity with the device (34).

Figure 14A:
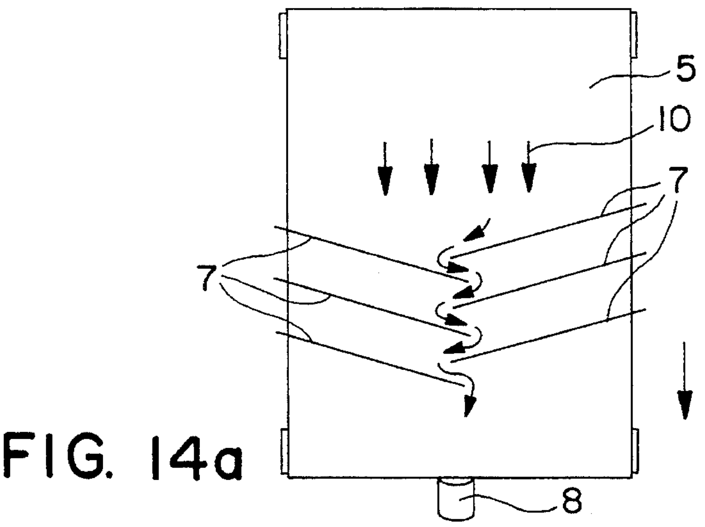
FIGS. 14*a–f* show variations of the invention in a top-view of the belt for the collection of the excessive lacquer material.

In FIGS. 14*a* through *f*, variations of the invention are represented. In FIG. 14*a* multiple lips (7) are arranged behind one another overlapping in the center region in the direction of transport (10). This arrangement distinguishes itself through an especially thorough removal of the spray medium from the belt (5). It should be mentioned that a complete removal of spray medium from the belt (5) is indeed favorable, however, in contrast to prior conveyor belt devices, it is not absolutely essential. With conveyor belts of the past, an absolute purification was necessary in order to safely avoid a contamination of the newly placed objects. With the invention's belt (5), an insignificant quantity of residual spray medium will not disrupt fundamental functions. In order to clean the belt (5) before color change, it can be intended that after completion of the spraying the belt continues and ultimately is cleansed of the previous color. This can be easily controlled by a corresponding control appliance of the belt drive.

Figure 14B:
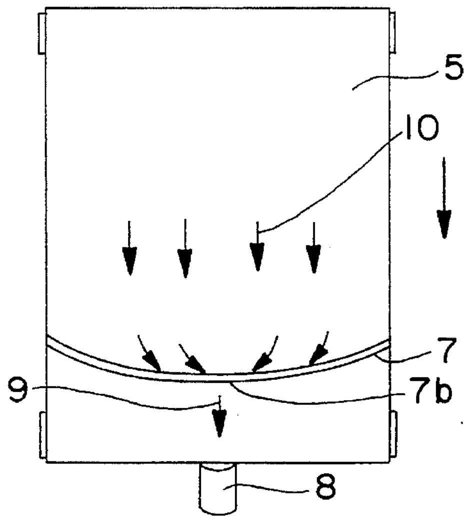
Figure 14C:
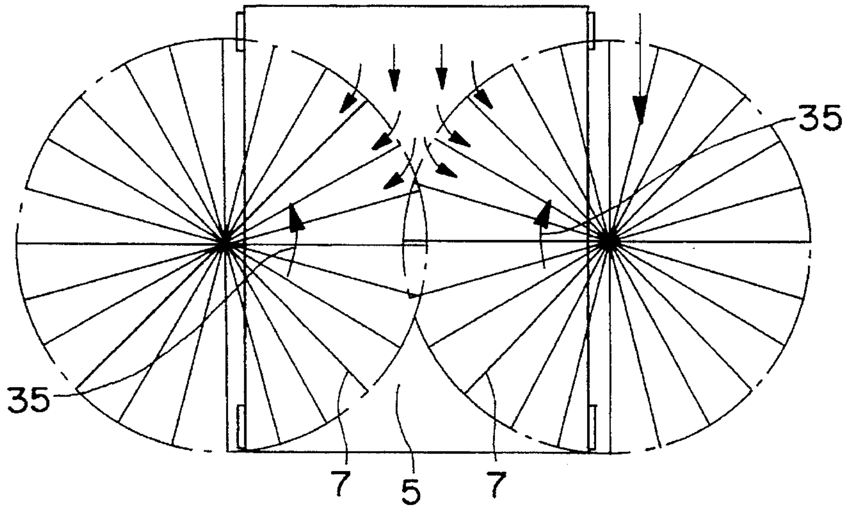

FIG. 14*b* shows a variation with a single curved lip (7) provided with central leak hole (7*b*) for formation of a narrow trace (9) which can be emptied by the removal pipe (8) . FIG. 14*c* shows an embodiment where the lips (7) are pivoted in the direction of the arrow (35).

Figure 14D:
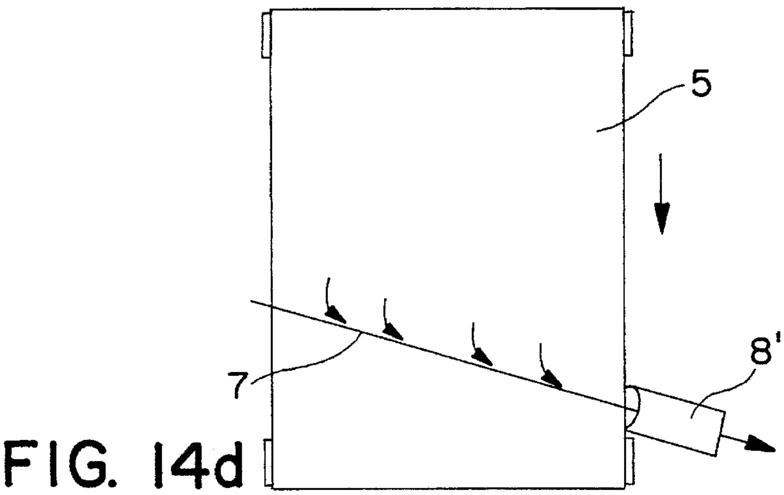
Figure 14E:
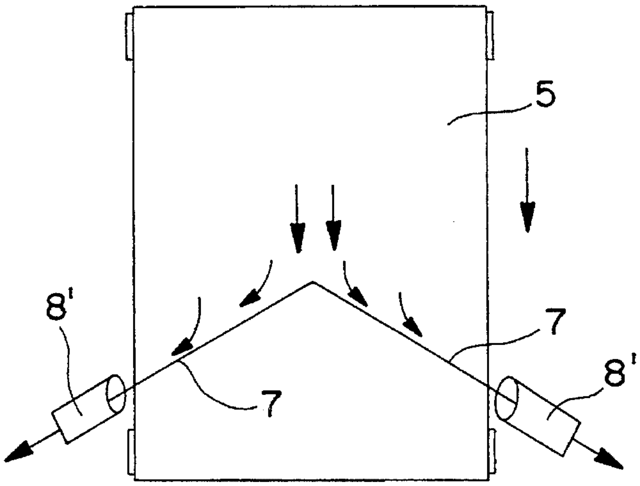

FIGS. 14*d* and 14(*e*) show embodiments where a single-step removal results, i.e. no trace formation on the belt (5); conversely the spray medium on the belt (5) is conducted along the lips (7) sideways into a pipe (8').

Figure 14F:
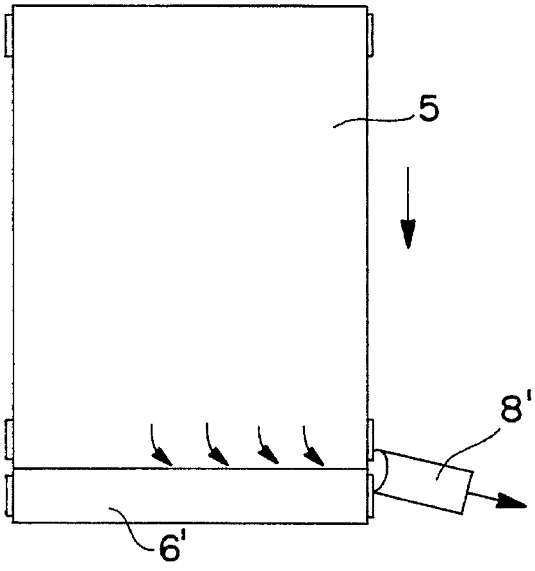

FIG. 14*f* shows a removal resulting from a side pipe (8') through a counter-rotating roller (6'), which also can be driven by the endless belt.

Figure 15A:
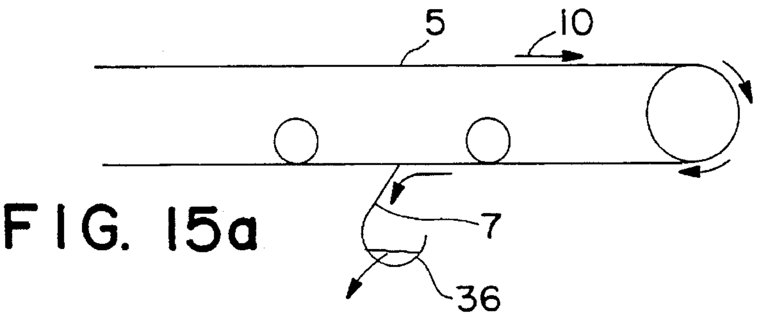
FIGS. 15*a–e* show variations of the invention in a schematic representation (side-view) of the belt for the collection of the excessive spray medium.
Figure 15B:
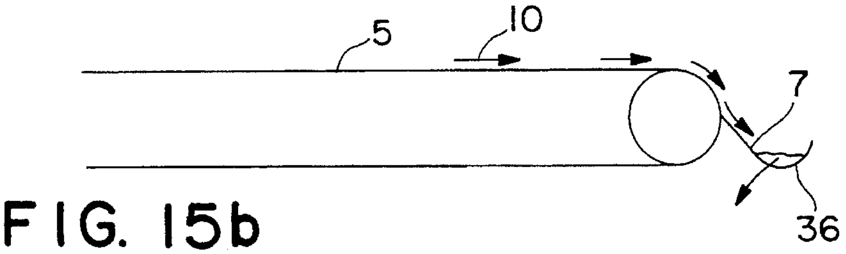
Figure 15C:
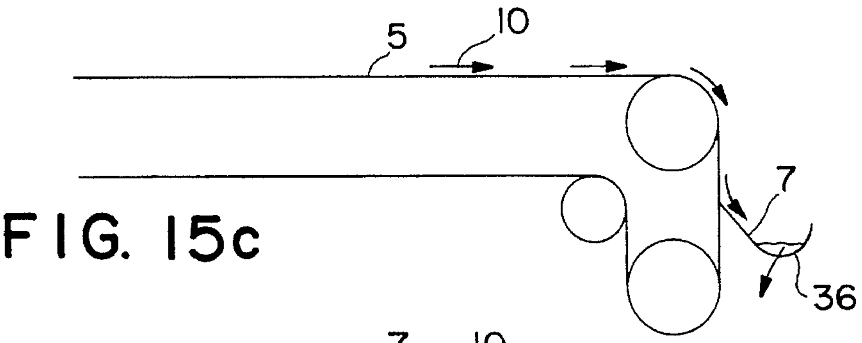
Figure 15D:
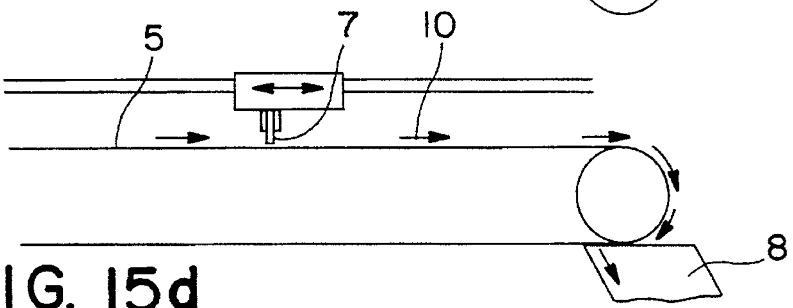
Figure 15E:
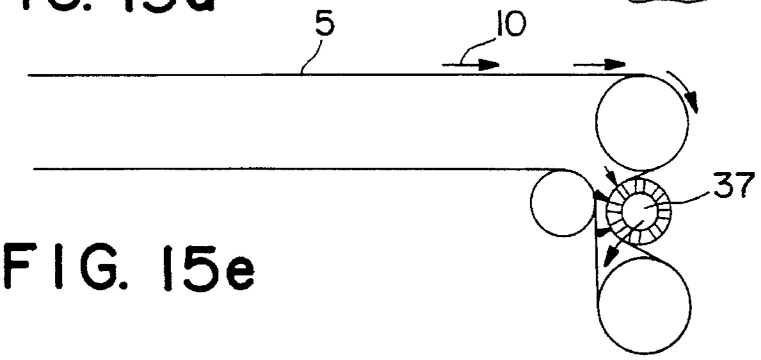

FIGS. 15*a*–15(*e*) are further schematic representations of the invention. FIGS. 15*a* and 15(*b*) show variations where the removal results through a gutter (36) whereby the removable lip (7) is formed in one piece with the gutter (36). As FIG. 15(*c*) shows, the gutter (36) can be fastened to a vertical piece of the l-shaped belt (5). The lip (7) can be installed, according to FIG. 15*d*, in the direction of transport (10). FIG. 15*e* shows a roller (37) with a perforated surface around which the belt (5) is led. The top side of the belt attaches to the surface of the roller (37), whereby the spray medium arrives inside of the roller (37) and from there can be discharged in the axial direction.

Figure 16A:
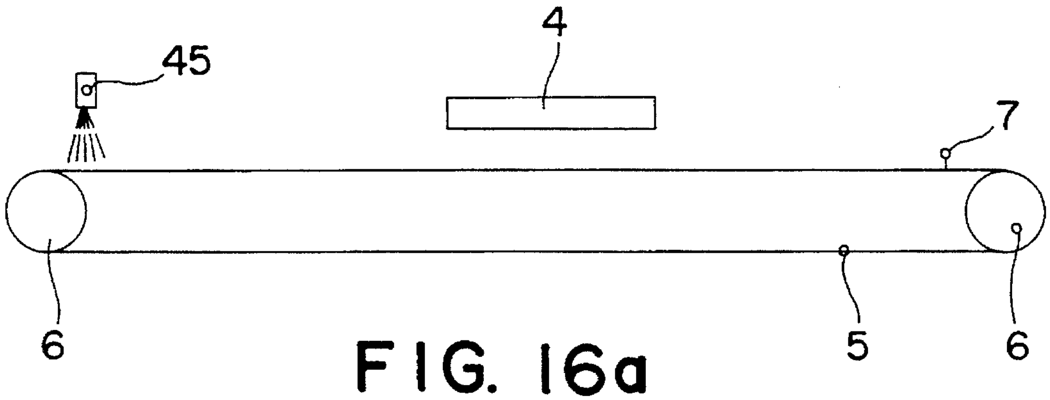
FIGS. 16*a–c* show variations of the invention in a schematic representation of the belt with application of blending agents.
Figure 16B:
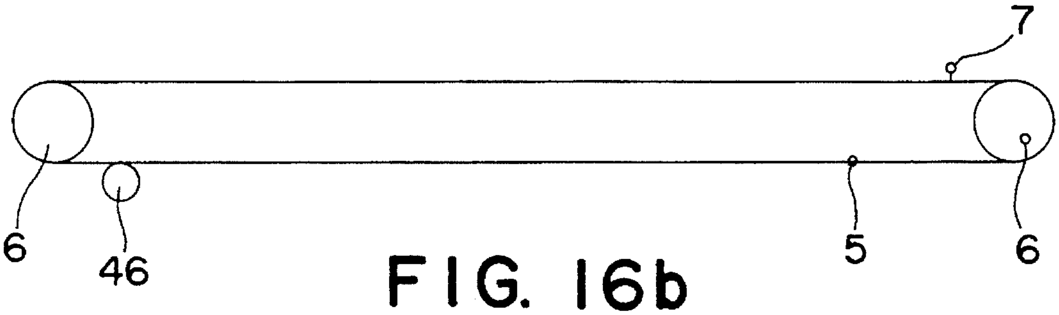
Figure 16C:
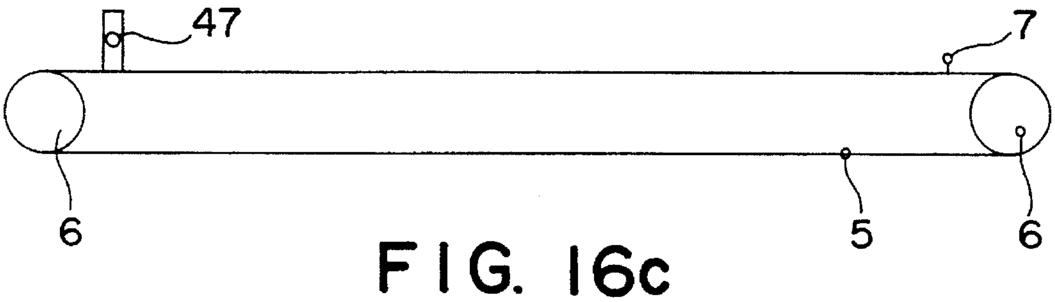

As described in the context of FIGS. 6 and 7, an application of an additional agent, in particular a solvent of recycled lacquer, is favorable for improved removal and re-use of the lacquer. FIGS. 16*a*–*c* show variations as to how this agent can be applied.

FIG. 16a presents a spray nozzle (45) in order to apply the agent to the belt (5). In accordance with FIG. 16b a application roller (46) is presented to the belts' underside, that applies the agent evenly on the belt (5). Such an application can also result from a porous or fibrous material strip (47), such as felt, in contact with the belt, as shown in FIG. 16c.

FIGS. 16a–c show variations in which the application of the blending agents on the belt (5) occurs in the middle region of the belt (5) where the floating spray medium impacts the objects on the belt. If the spray medium impacts the belt, the agents are intended to facilitate the removal through the lip (7) or a removal pipe (or similar not shown).

Figure 17A:
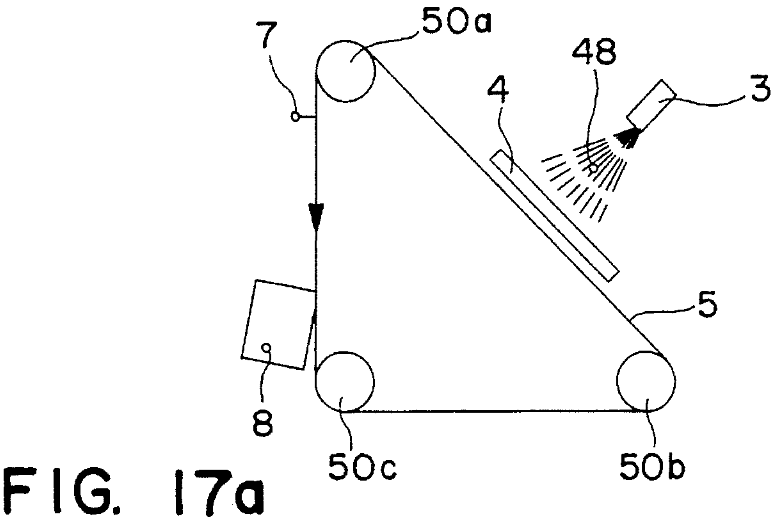
FIGS. 17*a–c* show variations of the invention in a schematic representation of the belt with belt guidance in a triangle.
Figure 17B:
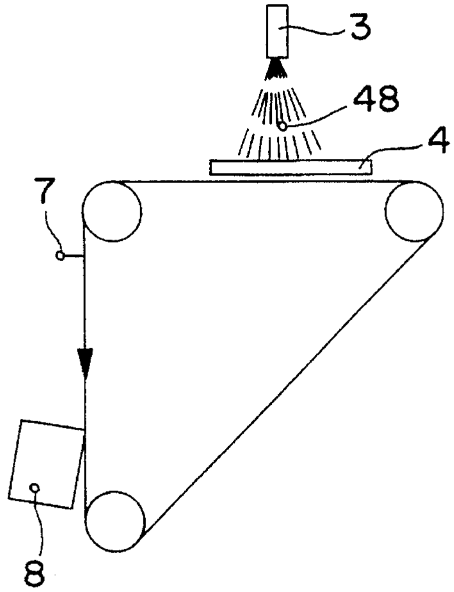
Figure 17C:
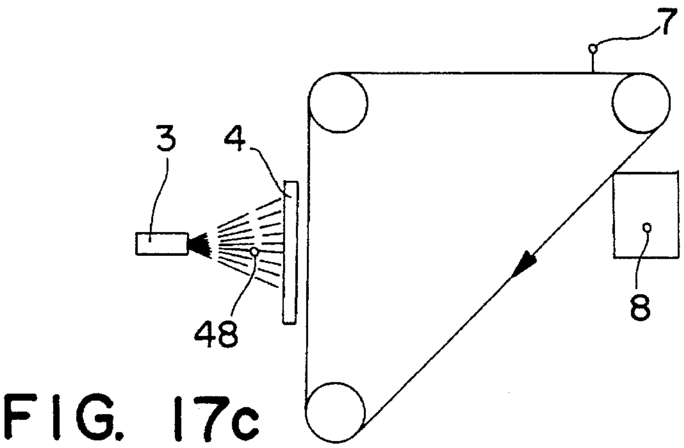

FIGS. 17a–c show variations of the guidance for the belt (5) of the collection device as shown, whereby the belt (5) is guided over a triangular arrangement of beams 50a, 50b, and 50c. This allows for the spraying of the medium (48) through the nozzles (3) and the removal of the excessive spray medium on the objects (4) from the belt (5) by means of the devices (7) and (8) in compact construction with reduced belt-length on one hand, and for a good spatial arrangement on various sides of the triangle on the other hand. In particular, the removal results from spur forming lips (7) and the subsequent drainage of the trace by a removal pipe (8).

Figure 18:
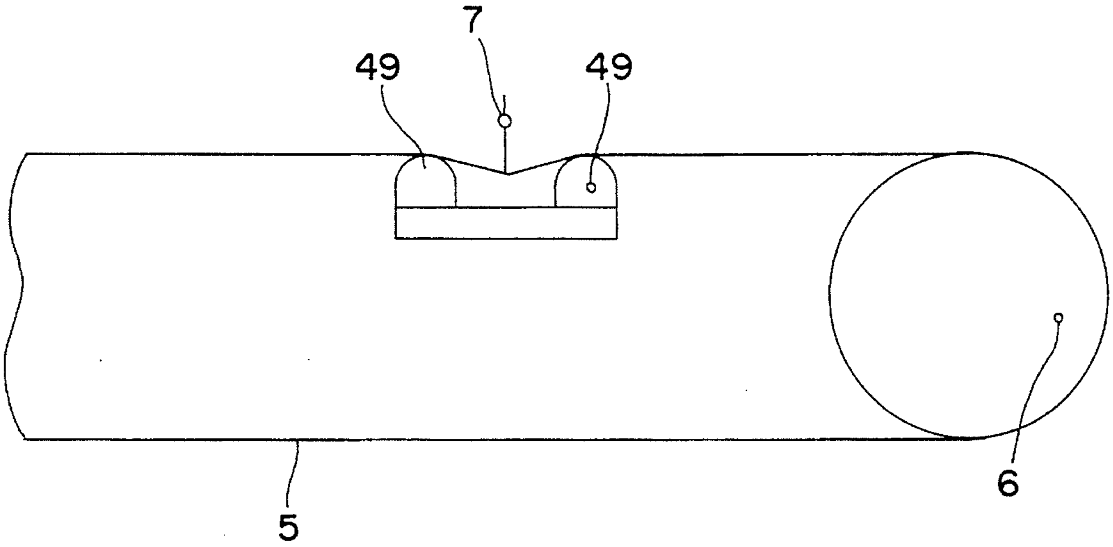
FIG. 18 shows a special belt support.

In order to guarantee a good attachment of the trace-forming lips (7) to the belt (5), two rounded supports (49) can be provided, as is shown in FIG. 18. Between these two rounded supports (49) the belt is free and unsupported. As shown in FIG. 18, onto this region trace-forming lips are pressed onto this region from above.

The lips (7), the removal pipe (8), and/or collection or reservoir for the removed spray medium can be cooled. This increases the so called "pot time" during which the lacquer can be re-used, which is an essential advantage with 2-component-lacquer. It is to be understood that the invention also includes the device described above having more than one removal pipe, more than one application roller, more than one applicator, more than one textural base web, or more than one trace of spray medium.

We claim:

1. A device for transporting objects to be treated with spray and for collecting and removing excess spray comprising transport means for objects lying thereon;

collection means for collecting excess spray medium which passes by the objects and the transport means, said collection means comprising an endless belt which is independent of said transport means, a removal device for removal of excess spray medium from said belt; and trace-forming means for bringing together the excess spray medium on the belt to at least one trace of spray medium which is narrower than the width of the belt;

wherein said removal device is positioned and arranged for removal of the trace(s) from the belt.

2. The device for transporting objects to be treated with spray and for collecting and removing excess spray of claim 1 wherein the trace-forming means form a single trace of spray medium in the center of the belt.

3. The device for transporting objects to be treated with spray and for collecting and removing excess spray of claim 1 comprising means for controlling a rotation velocity of the belt for collecting excess spray medium, wherein the rotation velocity of the belt for collecting excess spray medium is higher than a velocity of the transport means.

4. A device for supporting objects to be treated with spray and for collecting and removing excess spray compromising support means for objects lying thereon;

collection means for collecting excess spray medium which passes by the objects and the support means, said collection means comprising an endless belt which is independent of said support means;

a removal device positioned and arranged for removal of said excess spray medium from said belt; and wherein said support means comprises threads stretched over the belt, said threads being stretched between holders which are mounted on sliding carriages.

5. A device for transporting objects to be treated with spray and for collecting and removing excess spray comprising transport means for objects lying thereon;

collection means for collecting excess spray medium which passes by the objects and the transport means, said collections means comprising an endless belt which is independent of said transport means, and a removal device positioned and arranged for removal of said excess spray medium from said belt;

wherein the transport means and the belt are pivotal around a horizontal axis and can be raised by a pneumatic adjusting device.

6. A device for supporting objects to be treated with spray and for collecting and removing excess spray comprising a support for the objects with collection means for collecting excess spray medium passing by the objects and the support, the collection means comprising an endless rotation belt independent of said support;

trace-forming means for bringing together excess spray medium on the belt to at least one trace of spray medium which is narrower than a width of the belt, and a removal device positioned and arranged for removal of said trace(s) from the belt.

7. The device for supporting objects to be treated with spray and for collecting and removing excess spray of claim 6 wherein the trace forming means comprises at least one lip positioned at an angle with respect to the direction of the belt's rotation, the lip being elastically pressed against the belt.

8. The device for supporting objects to be treated with spray and for collecting and removing excess spray of claim 7 wherein the lip is fastened to a support are being adjustable in relation to the belt.

9. The device for supporting objects to be treated with spray and for collecting and removing excess spray of claim 7 wherein the lip is made of an elastic material.

10. The device for supporting objects to be treated with spray and for collecting and removing excess spray of claim 9 wherein the lip is made of a thin metal blade.

11. The device for supporting objects to be treated with spray and for collecting and removing excess spray of claim 7 wherein a side of the lip facing the excess spray medium on the belt forms an acute angle (∝) with the belt surface.

12. The device for supporting objects to be treated with spray and for collecting and removing excess spray of claim 6 wherein the removal device comprises at least one pipe which is elastically pressed against the belt.

13. The device for supporting objects to be treated with spray and for collecting and removing excess spray of claim 12 wherein said belt is directed over a guide roller and the at least one pipe is pressed against the belt in a region of the guide roller.

14. The device for supporting objects to be treated with spray and for collecting and removing excess spray of claim 6 further comprising a device for application of an additive agent to the belt.

15. The device for supporting objects to be treated with spray and for collecting and removing excess spray of claim 14 wherein the device for application of the additive agent comprises at least one nozzle for spraying of the additive agent on the belt.

16. The device for supporting objects to be treated with spray and for collecting and removing excess spray of claim 14 wherein the device for application of the additive agent comprises at least one application roller for applying a blending agent on the belt.

17. The device for supporting objects to be treated with spray and for collecting and removing excess spray of claim 14 wherein the device for application of the additive agent comprises at least one applicator staying in contact with the belt, the applicator being made of porous or fibrous material.

18. The device for supporting objects to be treated with spray and for collecting and removing excess spray of claim 17 wherein the applicator is made of a felt.

19. The device for supporting objects to be treated with spray and for collecting and removing excess spray of claim 14 wherein the device for application of the additive agent is positioned so that the additive agent impacts the belt before the excess spray medium impacts the belt.

20. The device for supporting objects to be treated with spray and for collecting and removing excess spray of claim 14 wherein the device for application of the additive agent and the trace-forming means are an integrally formed unit.

21. The device for supporting objects to be treated with spray and for collecting and removing excess spray of claim 14 wherein the additive agent is a lacquer solvent.

22. The device for supporting objects to be treated with spray and for collecting and removing excess spray of claim 6 comprising means for controlling a rotation velocity of the belt for collecting excess spray medium, wherein the rotation velocity of the belt for collecting excess spray medium is controllable at a constant rate.

23. The device for supporting objects to be treated with spray and for collecting and removing excess spray of claim 6 wherein the belt is guided over two rounded supports between which the belt is unsupported and at least a portion of the trace-forming means is pressed against the belt suspended in a region between the two rounded supports.

24. The device for supporting objects to be treated with spray and for collecting and removing excess spray of claim 6 wherein the belt is guided over a triangular arrangement of rollers (50*a*), (50*b*), and (50*c*), whereby the collection of excess spray medium and its removal from the belt takes place at different sides of the triangular arrangement.

25. The device for supporting objects to be treated with spray and for collecting and removing excess spray of claim 24 wherein the triangular arrangement of rollers forms a right triangle.

26. A device for supporting objects to be treated with spray and for collecting and removing excess spray comprising a support for the objects and collection means for collecting excess spray medium passing by the objects and the support, the collection means comprising an endless belt independent from said support wherein the support comprises thin threads stretched over the belt, said threads being stretched between holders which are mounted on sliding carriages.

27. A device for supporting objects to be treated with spray and for collecting and removing excess spray comprising support means for objects thereon;

collection means for collecting excess spray medium which passes by the objects and the support means, said collection means comprising an endless belt which is independent of said support means, and a removal device positioned and arranged for removal of excess spray medium from said belt;

wherein the support means and the belt are pivotal around a horizontal axis and can be raised by a pneumatic adjusting device.

* * * * *

UNITED STATES PATENT AND TRADEMARK OFFICE

CERTIFICATE OF CORRECTION

Patent No.: 5,494,517

Issued: February 27, 1996

Inventor(s): Eder et al.

It is certified that error appears in the above-identified patent and that said Letters Patent is hereby corrected as shown below:

Column 8, Line 17: Delete "collections" and insert -- collection -- therein.

Column 8, Line 43: Delete "are" and insert -- arm -- therein.

Signed and Sealed this

Twenty-third Day of July, 1996

*Attest:*

BRUCE LEHMAN

*Attesting Officer*

*Commissioner of Patents and Trademarks*